United States Patent
Chen

(10) Patent No.: US 6,604,822 B1
(45) Date of Patent: Aug. 12, 2003

(54) SEPARATE CLIP FOR ATTACHMENT GLASSES

(76) Inventor: Lee-Tsung Chen, P.O. Box 697, Feng-Yuan City, Taichung Hsien 420 (TW)

(*) Notice: Subject to any disclaimer, the term of this patent is extended or adjusted under 35 U.S.C. 154(b) by 0 days.

(21) Appl. No.: 10/310,775

(22) Filed: Dec. 6, 2002

(51) Int. Cl.[7] .................................................. G02C 9/00
(52) U.S. Cl. .......................................... 351/47; 351/57
(58) Field of Search .............................. 351/47, 57, 48, 351/58, 44, 41, 158

(56) References Cited

U.S. PATENT DOCUMENTS 6,283,591 B1 * 9/2001 Chen .......................... 351/47

* cited by examiner

*Primary Examiner*—Hung Xuan Dang

(57) ABSTRACT

A separate clip for attachment glasses is provided. The clip is combined with an upper gripping piece and a lower gripping piece. The upper gripping piece has a pair of retaining recesses to receive a pair of magnets therein and a lug on underside with an aligned through hole in free end. The lower gripping piece has a barrel on rear end engaged with the aligned through hole of the upper gripping piece and rotatably secured by a pin, a pair retaining recesses on front end received a pair of magnets which are made in registry with the magnets of the upper gripping piece, a positioning plate connected to the outer surface of the barrel and made releasably enageable with a pair of coupling gaps of an attachment glasses and a gripping space defined between the barrel and the retaining recesses for gripping the bridge of a spectacles.

3 Claims, 7 Drawing Sheets

SEPARATE CLIP FOR ATTACHMENT GLASSES

BACKGROUND OF THE INVENTION

The present invention relates to spectacles and more particularly to a separate clip for attachment glasses to grip the bridge of a pair of spectacles.

As we know that a pair of spectacles are helpful to the people who have eyesight problems. It not only improves the user's eyesight, protects the eye from under strong light and ultraviolet rays but also beautifies the face of the user. A nearsightedness could not leave the spectacles and feels difficult to walk under the sunshine. If he wears a pair of plane dark colored glasses, he can not see anything in front of him except that the lens of the dark colored glasses has the same degrees suitable to him. This may cost too much for him. So that an attachable sun glasses is therefore produced to directly attach to the lens of the spectacles in order to solve this problem. However, the attachment of the attachable sun glasses to the spectacles has may disadvantages on design such that the original spectacles must be amended to match with the sun glasses or that the sun glasses must be designed to match with different shapes of the spectacles. Otherwise, the sun glasses will break off under any vibration when the user jumps or runs.

The applicant of this invention has been granted two U.S. Patent (U.S. Pat. Nos. 6,283,591B1 and 6,293,672B1) on which a pair of magnetic gripping plates horizontally or vertically fix to the bridge of an attachment glasses and grip on the bridge of a pair spectacles. The attachment result is very good. The coupling of the gripping plates with the attachment glasses includes fixed connection or pivotal connection all of which requires special manufacturing of the component parts and assembly of the parts to the attachment glasses. Besides, the component parts must variable to match with different shapes of the spectacles. This is very inconvenient.

SUMMARY OF THE PRESENT INVENTION

The present invention has a principal object to provide a separate clip for attachment glasses. The separate clip can easily engage with the attachment glasses and firmly grip the spectacles.

Another object of the present invention is to provide a separate clip for attachment glasses which clip suit to variety to attachment glasses and spectacles and omits assembly process.

Accordingly, the separate clip for attachment glasses of the present invention comprises a separate clip having an upper gripping piece and a lower gripping piece pivotally connected to the upper gripping. Each of the gripping pieces has at least a magnet attracting each other. The lower gripping piece has a positioning plate engageable into a pair of coupling gaps in the bridge of the attachment glasses and a gripping space for gripping the bridge of a spectacles therein. Due to the magnets, the gripping of the attachment glasses to the spectacles is very stable and reliable. The characteristic of this separate clip is suitable to the variety of attachment glasses and spectacles.

The present invention will become more fully understood by reference to the following detailed description thereof when read in conjunction with the attached drawings.

DETAILED DESCRIPTION OF THE PREFERRED EMBODIMENT

Figure 1:
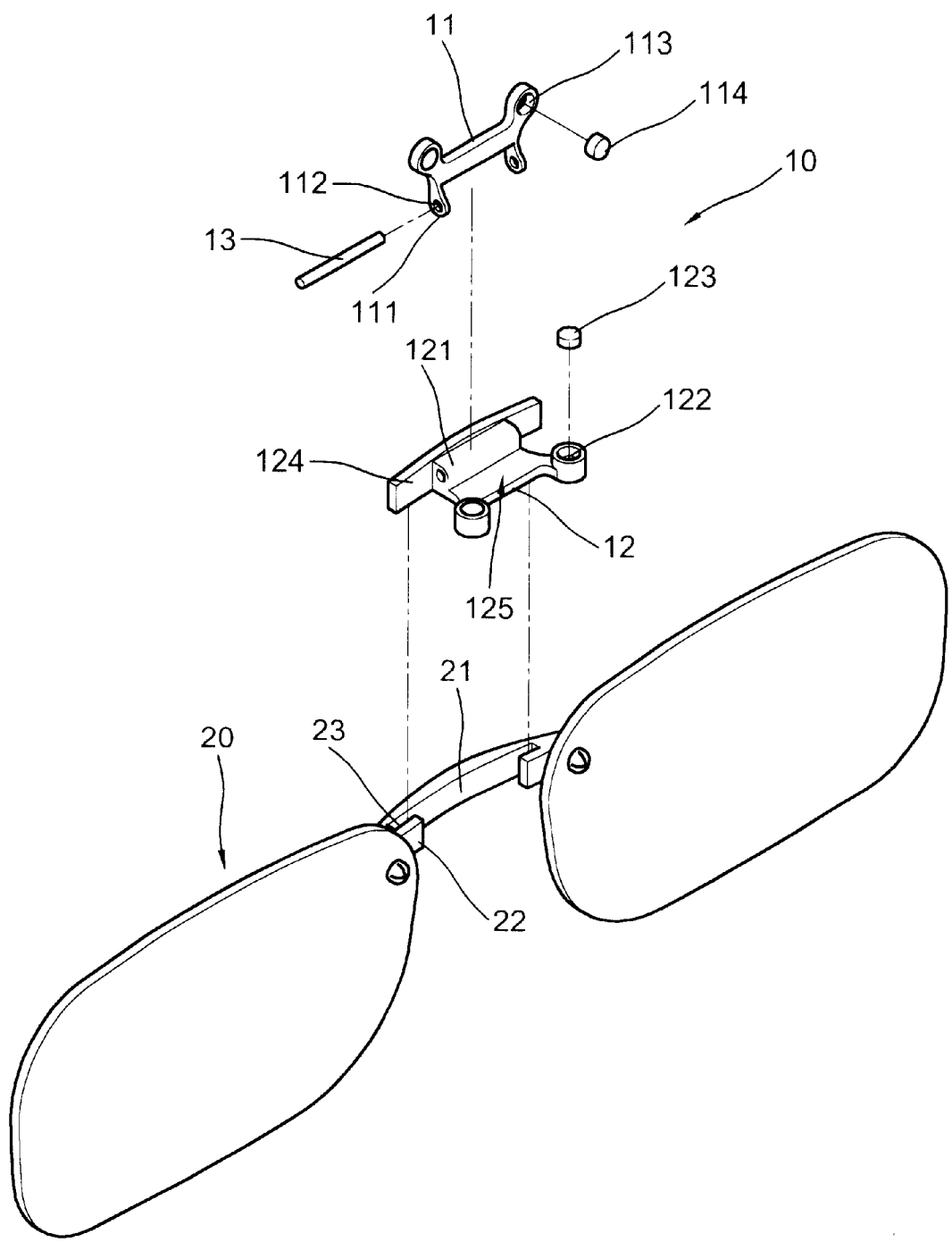
FIG. 1 is an exploded perspective view showing a separate clip of a first embodiment of the present invention.
Figure 2:
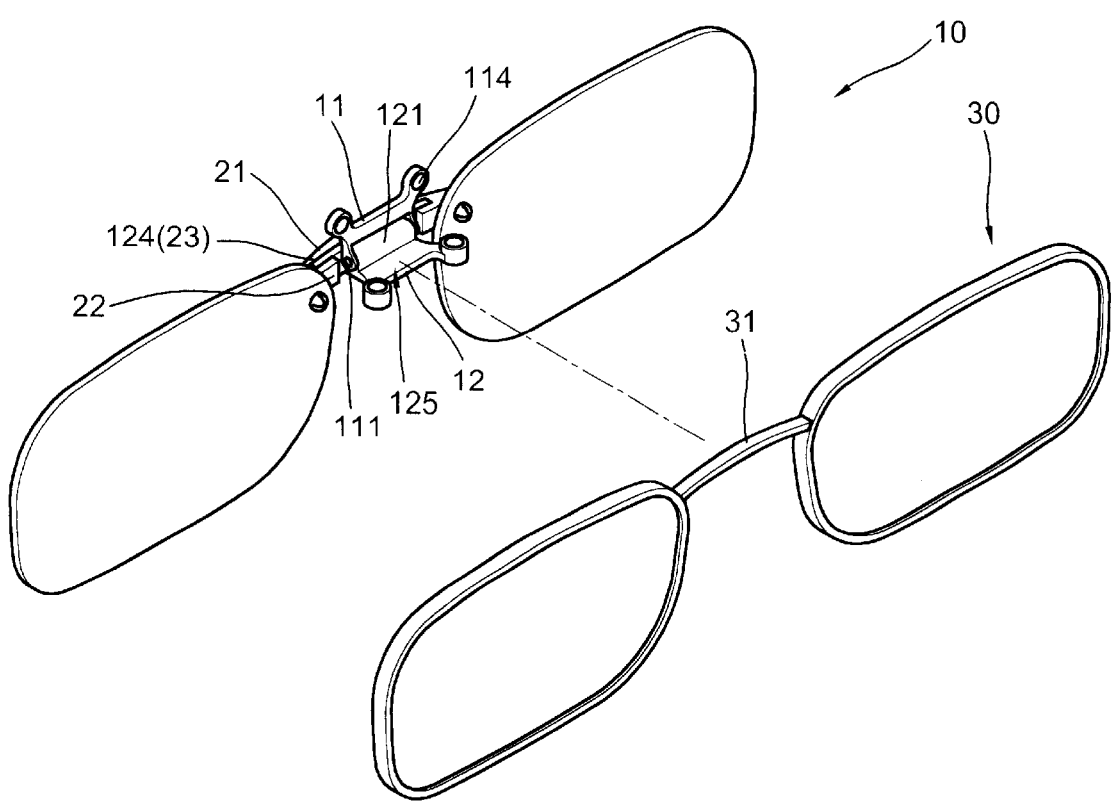
FIG. 2 is a perspective view showing that the separate clip is engaged with an attachment glasses and enables the attachment glasses to grip the bridge of a spectacles.
Figure 3:
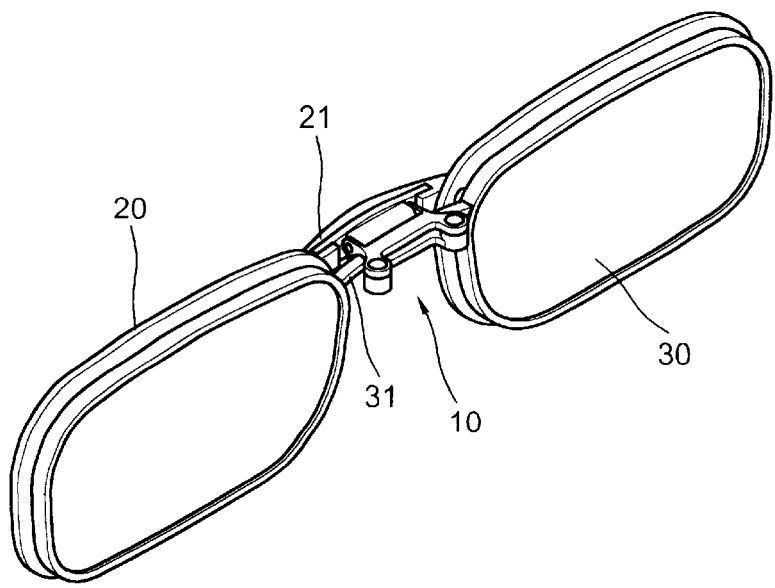
FIG. 3 is a perspective view showing that the clip is already gripped the bridge of the spectacles.

With reference to FIGS. 1, 2 and 3 of the drawings, the separate clip for attachment glasses of the first embodiment of the present invention comprises a separate clip 10 combined with an upper gripping piece 11 and a lower gripping piece 12. The upper gripping piece 11 has a lug 111 on underside including an aligned through hole 112 adjacent the end thereof, a pair of inclined branches spacedly formed on the top opposite to the lug 111 each having a retaining recess 113 adjacent the end for disposing magnet 114 therein. The lower gripping piece 12 has a barrel 121 on rear end, a pair of protrudent retaining recesses 122 spacedly formed on front end for respectively disposing a pair magnets 123 of opposing pole relative to the magnets 114, a positioning plate 124 connected to the outer surface of the barrel 121 and a gripping space 125 defined between the retaining recess 122 and the barrel 121. When assembling, engage the barrel 121 of the lower gripping piece 12 with the aligned through hole 112 of the lug 111 of the upper gripping piece 11 and rotatably secured by a pin 13.

An attachment glasses 20 has a bridge 21 and a pair of protrusions 22 symmetrically formed at two ends of the bridge 21 and parallel to the bridge 21 so as to define a pair of coupling gaps 23 therebetween for engaging with the positioning plate 124 of the separate clip 10.

Figure 4:
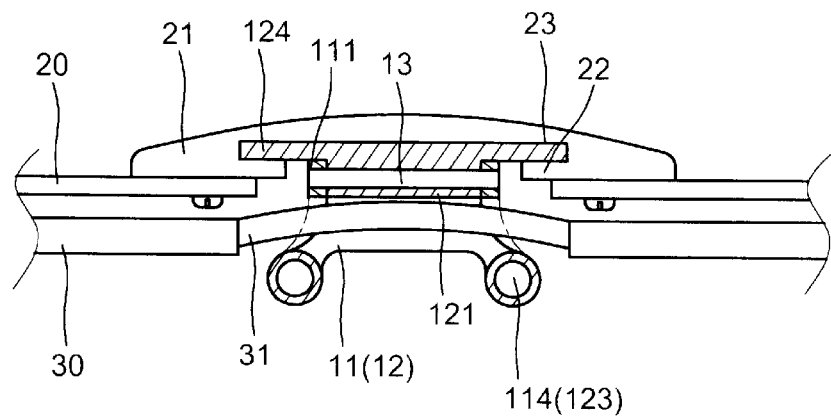
FIG. 4 is a top view with partially sectional view of FIG. 3.
Figure 6:
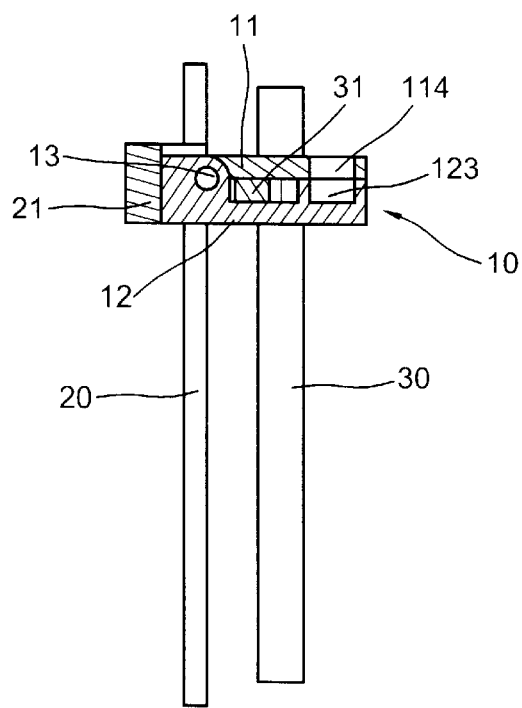
FIG. 6 is a sectional view showing that the upper gripping piece is at a closed position.
Figure 5:
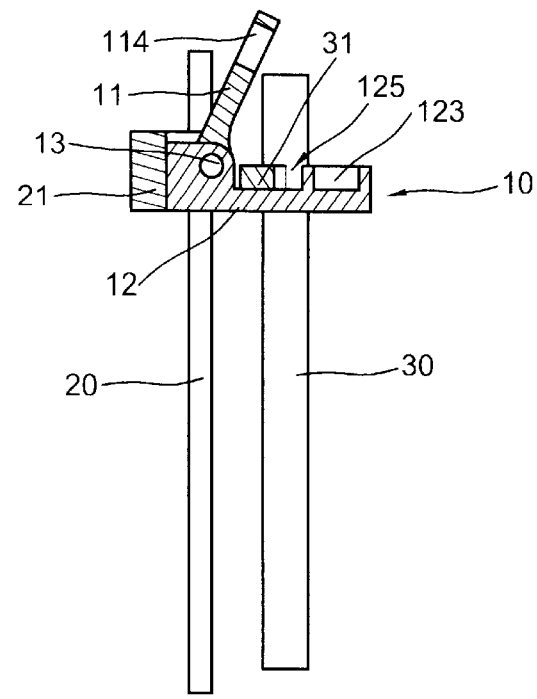
FIG. 5 is a sectional view showing that a upper gripping piece is at an open position.

Based on afore discussed structure, the separate clip 10 is independent of the attachment glasses 20. It neither integrates with nor secure to but releasably engaged with the coupling gaps 23 of the attachment glasses 20 and firmly grips the attachment glasses 10 to the bridge 31 of a pair of spectacles 30 due to the attraction of the magnets 114 and 123 (as shown in FIGS. 4, 5 and 6).

Figure 7:
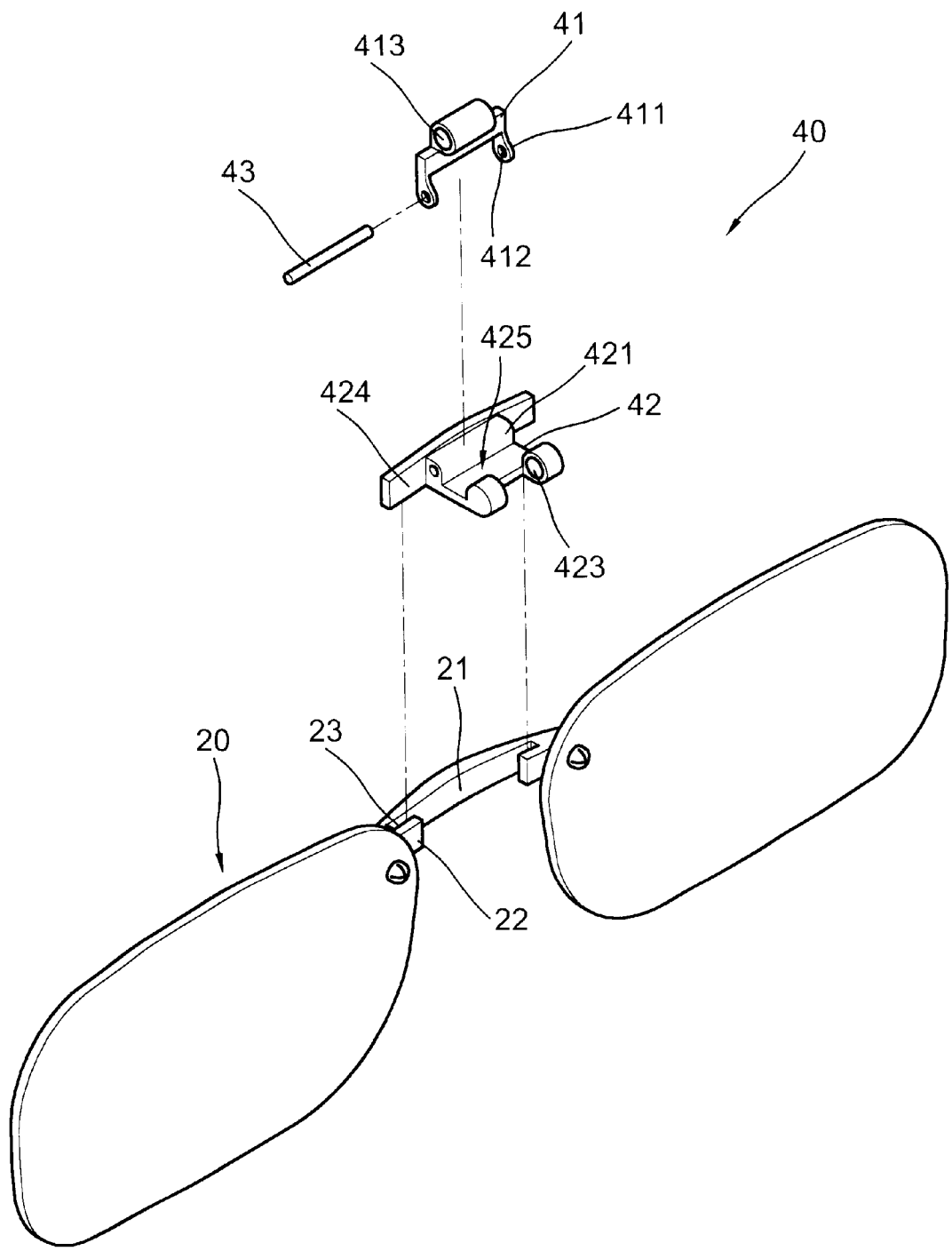
FIG. 7 is an exploded perspective view showing a separate clip of a second embodiment of the present invention.
Figure 8:
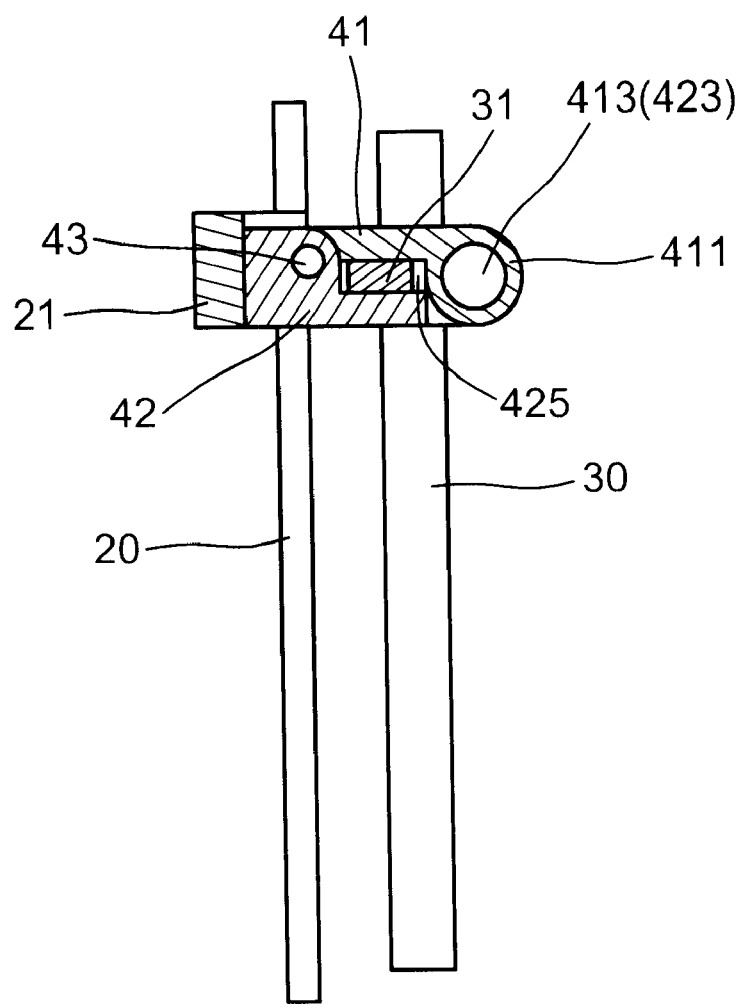
FIG. 8 is a sectional view showing that the separate clip of FIG. 7 grips the spectacles.

Referring to FIGS. 7 and 8, a second embodiment of the separate clip 40 of the present invention is provided. The separate clip 40 is combined with an upper gripping piece 41 and a lower gripping piece 42. The upper gripping piece 41 has a lug 411 having an aligned though hole 412 on underside and transverse tube on the top engaged within an elongate magnet 413. The lower gripping piece 42 has a barrel 421 on rear end engaged with the aligned through hole 412 of the upper gripping piece 41 and rotatably secured by a pin 43, a pair of horizontal recesses symmetrically formed on front end each engaged within a magnet 423 with is made in registry with the elongate magnet 413 of the upper gripping piece 41, a positioning plate 424 connected to the outer surface of the barrel 421 releasably engageable with the coupling gaps 23 of the attachment glasses 20 and a gripping space 425 defined between the barrel 421 and the horizontal recesses for gripping the bridge of the spectacles 30. When the positioning plate 424 of the separate clip 40 releasably engaged within the coupling gaps 23 of the attachment glasses 20 and the upper and lower gripping piece grip the bridge 31 of the spectacles 30, the magnets 413 and 423 will attract each other.

Figure 9:
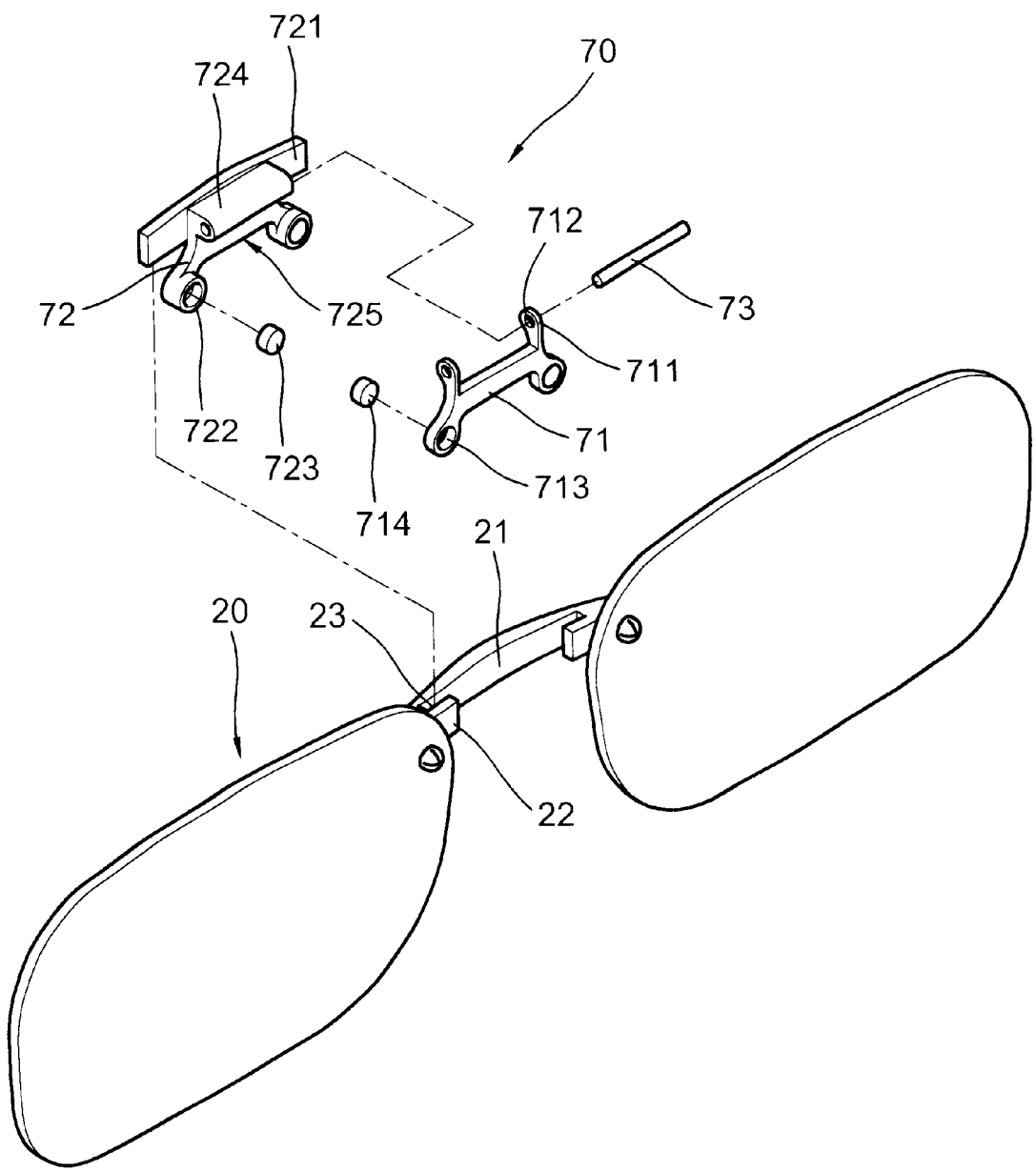
FIG. 9 is an exploded perspective view showing a separate clip of a third embodiment of the present invention.
Figure 11:
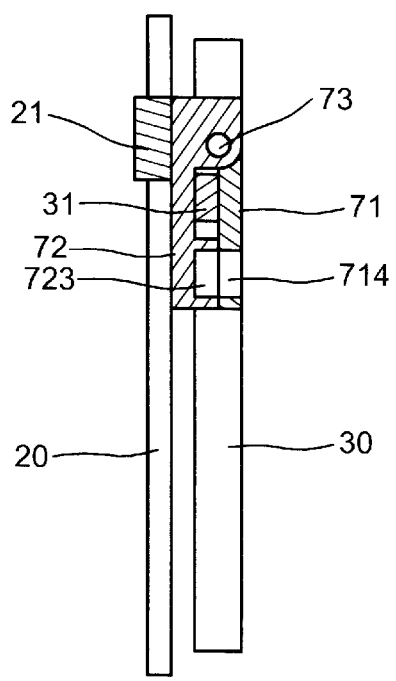
FIG. 11 is a sectional view showing that the front gripping piece is at closed position.
Figure 10:
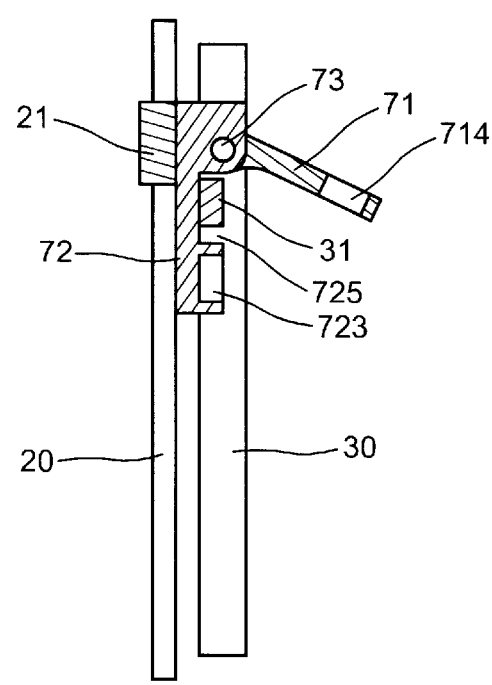
FIG. 10 is a sectional view showing that a front gripping piece is at open position.

Referring to FIGS. 9, 10 and 11, a third embodiment of the separate clip 70 is provided. The separate clip 70 is combined with a front gripping piece 71 and a rear gripping piece 72. The front gripping piece 71 has a lug 711 on the top with an aligned through hole 712 in free end and a pair of first inclined braches spacedly formed on underside each having a first retaining recess 713 abutting free end for respectively disposing a pair of magnets 714 therein. The rear gripping piece 72 has a positioning plate 724 on the back made engageable with the coupling gaps 23 of the attachment glasses 20, a pair of second inclined branches on underside each having a second retaining recess 722 for respectively disposing a pair of magnets 723 therein which is made in registry with the magnets 714 of the front gripping piece 71 and a barrel 721 on the top made engaged with the aligned through hole 712 of the front gripping piece 71 and rotatably secured by a pin 73. After the positioning plate 724 releasably engaged within the coupling gaps 23 of the attachment glasses 20, the separate clip 70 is able to vertically grip the bridge 31 of the spectacles 30. The gripping is also very stable due to the attraction of the magnets 714 and 723. If a strong clip is made under the rear gripping piece 72 to grip the bridge 21 of the attachment glasses 20, it will obtain the same result.

Further, the separate clip 10, 40 and 70 can be made to different sizes in order to match with the variety of the attachment glasses 20 and the spectacles 30. Because of the ready engagement of the separate clip 10, 40 and 70 to the attachment glasses 20 it provides a great convenience and benefit to the manufacturer, the optician's shop and the users.

Note that the specification relating to the above embodiment should be construed as exemplary rather than as limitative of the present invention, with many variations and modifications being readily attainable by a person of average skill in the art without departing from the spirit or scope thereof as defined by the appended claims and their legal equivalents.

I claim:

1. A separate clip for attachment glasses comprising:
an attachment glasses having a bridge and a pair of protrusions symmetrically formed at two ends of said bridge and parallel to said bridge to define a pair of coupling gaps therebetween;
a separate clip which is combined with an upper gripping piece and a lower gripping piece wherein said upper gripping piece has a lug on underside with an aligned through hole adjacent free end thereof and a pair of inclined branches spacedly formed on top each having a retaining recess adjacent free end for respectively disposing a pair of magnets therein, said lower gripping piece has a barrel on rear end engaged with the aligned through hole of said upper gripping piece and rotatably secured by a pin, a pair of protrudent recesses spacedly formed on front end for respectively disposing a pair of magnets of opposing poles which are made in registry with the magnets of said upper gripping piece, a positioning plate connected to outer surface of said barrel made releasably engageable with the coupling gaps of said attachment glasses and a gripping space defined between said barrel and said protrudent recesses for gripping a bridge of a spectacles therein.

2. A separate clip for attachment glasses comprising:
an attachment glasses having a bridge and a pair of protrusions symmetrically formed at two ends of said bridge and parallel to said bridge to define a pair of coupling gaps therebetween;
a separate clip which is combined with an upper gripping piece and a lower gripping piece wherein said upper gripping piece has a transverse tube on top engaged within an elongate magnet and a lug on underside having an aligned through hole adjacent free end, said lower gripping piece has a barrel on rear end engaged with the aligned through hole of said upper gripping piece ad rotatably secured by a pin, a pair of horizontal recesses symmetrically formed on front end each engaged within a magnet which is made in registry with the elongate magnet of said upper gripping piece, a positioning plate connected to outer surface of said barrel and made releasably engageable with the coupling gaps of said attachment glasses and a gripping space defined between said barrel and said pair of horizontal recesses for gripping a bridge of a spectacles therein.

3. A separate clip for attachment glasses comprising:
an attachment glasses having a bridge and a pair of protrusions symmetrically formed at two ends of said bridge and parallel to said bridge to define a pair of coupling gaps therebetween;
a separate clip which is combined with a front gripping piece and a rear gripping piece wherein said front gripping piece has a lug on top with an aligned through hole adjacent free end and a pair of first inclined branches spacedly formed on underside each having a first retaining recess abutting free end for disposing a pair of magnets therein, said rear gripping piece has a pair of second inclined branches spacedly formed on underside each having a second retaining recess abutting free end for disposing therein a pair of magnets which are made in registry with the magnets of said front gripping piece, a barrel on top engaged with the aligned through hole of said front gripping piece and rotatably secured by a pin, a positioning plate connected to outer surface of said barrel made releasably engageable with the pair or coupling gaps of said attachment glasses and a gripping space defined between said barrel and said second retaining recess for gripping a bridge of a spectacles therein.

* * * * *